United States Patent [19]

Bartos et al.

[11] Patent Number: 4,758,208
[45] Date of Patent: Jul. 19, 1988

[54] AUTOMATIC BELT TENSIONER FOR VEHICLE COMBINED STARTER-GENERATOR

[75] Inventors: Andrew L. Bartos, Davisburg; Lubomyr O. Hewko, Clarkston, both of Mich.

[73] Assignee: General Motors Corporation, Detroit, Mich.

[21] Appl. No.: 72,742

[22] Filed: Jul. 13, 1987

[51] Int. Cl.$^4$ ............................................... F16H 7/12
[52] U.S. Cl. .................................... 474/135; 474/111; 474/134
[58] Field of Search ............... 474/101, 109, 111, 119, 474/121, 133, 134, 135

[56] References Cited

U.S. PATENT DOCUMENTS

| | | | |
|---|---|---|---|
| 2,726,364 | 12/1955 | Merritt | 474/135 X |
| 2,766,417 | 10/1956 | Merritt | 474/135 X |
| 2,969,267 | 1/1961 | Gothberg | 308/217 |
| 3,895,544 | 7/1975 | Suzaki | 474/134 X |
| 4,566,567 | 1/1986 | Miyatake | 192/45 |
| 4,679,676 | 7/1987 | King et al. | 192/45 |

Primary Examiner—Stephen J. Novosad
Assistant Examiner—Thy M. Bui
Attorney, Agent, or Firm—Patrick M. Griffin

[57] ABSTRACT

A belt tensioner assembly for a vehicle combined starter generator uses the shifting reaction torque incident to a change from generating to cranking mode or back to automatically select one of a pair of tensioner arms to tension the shifting slack side of a belt.

2 Claims, 2 Drawing Sheets

AUTOMATIC BELT TENSIONER FOR VEHICLE COMBINED STARTER-GENERATOR

This invention relates to vehicle belt tensioners in general, and specifically to a belt tensioner assembly for a vehicle combined starter-generator that automatically tensions the slack side of the belt, which shift with a change from the generating to the cranking mode.

BACKGROUND OF THE INVENTION

The general idea of a combined vehicle starter-generator that can operate in both a starting or cranking mode and in a generating mode has been known for some time. Such a mechanism, which may be conveniently referred to as a "stargen", promises substantial weight and cost savings, since the separate starter motor could be eliminated. However, the stargen has not found wide application because of several practical problems presented by its actual use. One of these practical problems is in maintaining the proper tension in the belt. A belt tensioner should operate on the slack side of the belt, which is not a problem in a conventional installation, since the slack side of the belt is invariant. With a stargen, however, since the belt would be driven in the starting mode, but would be the driver in the generating mode, the slack and tight sides of the belt would consequently shift with the change in mode.

SUMMARY OF THE INVENTION

The subject invention provides a belt tensioner assembly for a stargen, one that automatically tensions the slack side of the belt, regardless of the change in mode.

In the preferred embodiment disclosed, the stargen, which has a housing and a central belt pulley shaft, is mounted to the vehicle by a bracket in such a way that the housing can pivot or roll freely about the shaft axis. The housing experiences a changing reaction torque when the stargen changes from its generating to the cranking mode, which causes the housing to move. A cooperating slot and stop pin limits how far the housing can roll to a short arc defined between generating and cranking mode limit positions. A lower tensioner arm is journaled at its inner end to the housing so as to swing freely about the shaft axis, and an upper tensioner arm is similarly journaled at its inner end to the lower tensioner arm. Consequently, the two tensioner arms can swing relative to each other in scissors like fashion about the shaft axis, and a tension spring hooked between them continually swings them toward one another about the shaft axis. Each tensioner arm also has an idler pulley that is engageable with one side of the belt. In the particular embodiment disclosed, the upper tensioner arm is engageable with that side of the belt that is slack during the cranking mode, and conversely the lower tensioner arm is engageable with that side of the belt that is slack during the generating mode.

The invention provides a means that automatically responds to a mode change to select the tensioner arm that should be active, that is, the tensioner arm that is engageable with that side of the belt that is then slack. The other tensioner arm is simultaneously latched and disabled, and acts only as a rigidly mounted pulley would act, until the mode again changes. The inner end of each tensioner arm has a series of detent teeth arranged about the shaft axis. A latching pawl is pivoted to the stargen mounting bracket so as to rock back and forth between a first latching position where it engages only the detent teeth of the upper tensioner arm, and a second latching position where it engages only the detent teeth of the lower tensioner arm. A torsion spring continually biases the locking pawl to pivot in the clockwise direction, that is, toward the first latching position. A latching pawl trip lever is mounted to the stargen housing so as to be spaced from the latching pawl when the housing is at its generating mode limit position. Therefore, the locking pawl torsion spring, during the generating mode, maintains the latching pawl in the first latching position. Consequently, the upper tensioner is disabled, rigidly held and unable to swing. The lower tensioner arm, however, is active, still able to swing back and forth under the force of the tension spring to tension the then slack side of the belt. When the mode changes from generating to cranking, the stargen housing rolls in the counterclockwise direction, to its other limit position. The trip lever moves with the housing, hitting and rocking the latching pawl out of the first, and into the second latching position, thereby disabling the lower tensioner arm, and simultaneously, freeing the upper tensioner arm. The trip lever moves back away from the latching pawl to allow it to return to the first latching position when the mode again changes back to the generating mode and the stargen housing moves back to the generating mode limit position. This automatic shift in tensioning is obtained from a purely mechanical structure, with no need of electronic sensors or activators.

It is, therefore, an object of the invention to provide a belt tensioner assembly for a vehicle stargen that automatically selects the shifting slack side of the belt as the stargen changes between generating and cranking modes.

It is another object of the invention to provide such a tensioner assembly that operates by mounting the stargen to the vehicle so that the stargen housing rolls about the shaft axis between defined limit positions in response to the shifting reaction torque experienced by the housing as the mode changes, and which uses a locking pawl and trip lever combination that acts automatically in response to the movement of the stargen housing to disable the tensioner arm that is then on the tight side of the belt, while freeing the other tensioner arm to actively tension the then slack side of the belt.

DESCRIPTION OF THE PREFERRED EMBODIMENT

These and other objects and features of the invention will appear from the following written description, and from the drawing, in which.

Figure 1:
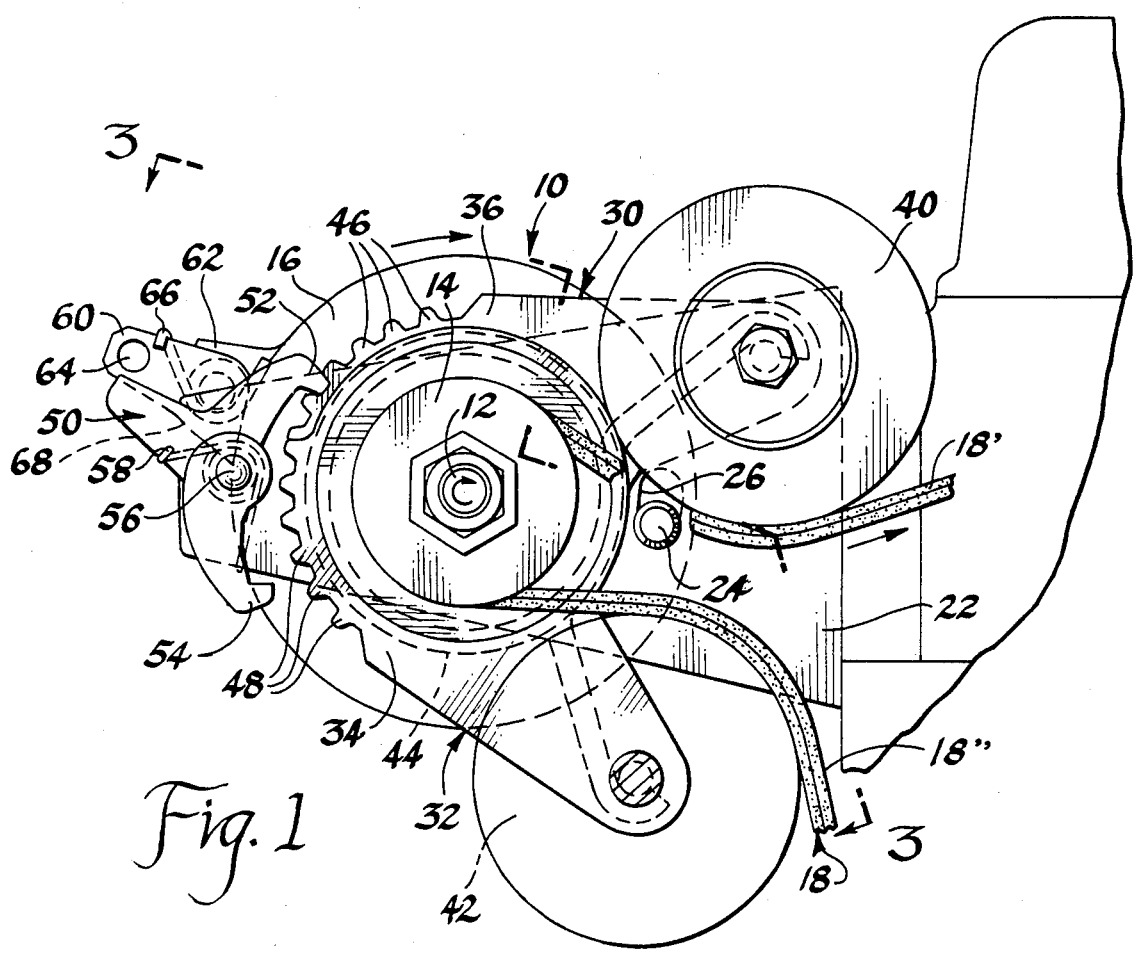
FIG. 1 is an end view looking into the belt pulley of a stargen mounted to a vehicle and incorporating a preferred embodiment of the tensioner assembly of invention, during the generating mode.
Figure 2:
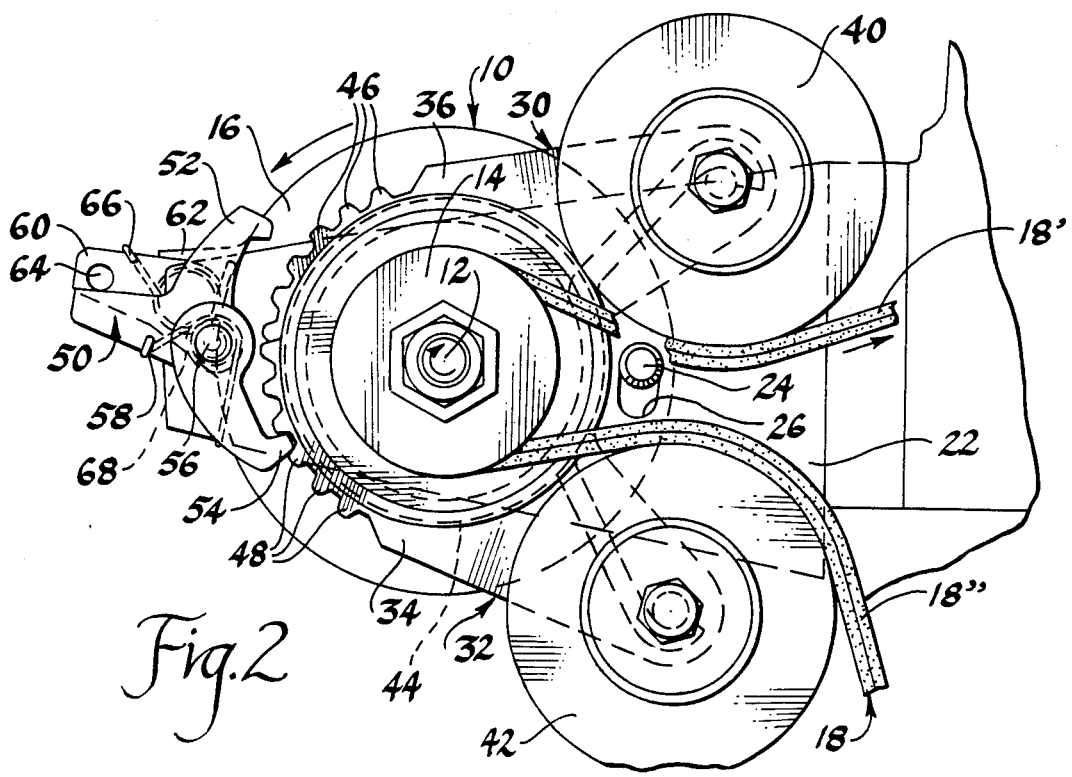
FIG. 2 is a view like FIG. 1, but showing the cranking mode.

Referring first to FIGS. 1 and 2, a combined starter-generator, referred to conveniently as a stargen, is indicated generally at 10. Stargen 10 has a central shaft 12, which mounts a belt pulley 14, and a surrounding housing 16. Stargen 10 serves both as a generator and as the starting motor for a vehicle, being driven by a generally designated belt 18 in the generating mode of FIG. 1, but driving the belt 18 in the starting or cranking mode, FIG. 2. In the generating mode, the upper run of the belt, 18' is tight, while the lower run 18" is slack. That situation is reversed during the cranking mode of FIG. 2, so that the upper run 18' is slack, while the lower run 18" is tight. Another consequence of the change in mode is that although shaft 12 always turns clockwise, the housing 16 experiences a reaction torque in the clockwise direction for the FIG. 1 generating mode, but counterclockwise for the FIG. 2 cranking mode, as shown by the arrows around the outside of housing 16. The reaction torque is not particularly large in magnitude and the conventional mounting of either a generator or starter housing is rigid. The invention, on the other hand, takes advantage of the reaction torque seen by the housing 16 to automatically select and tension whichever side of the belt 18 that is then the slack side.

Figure 3:
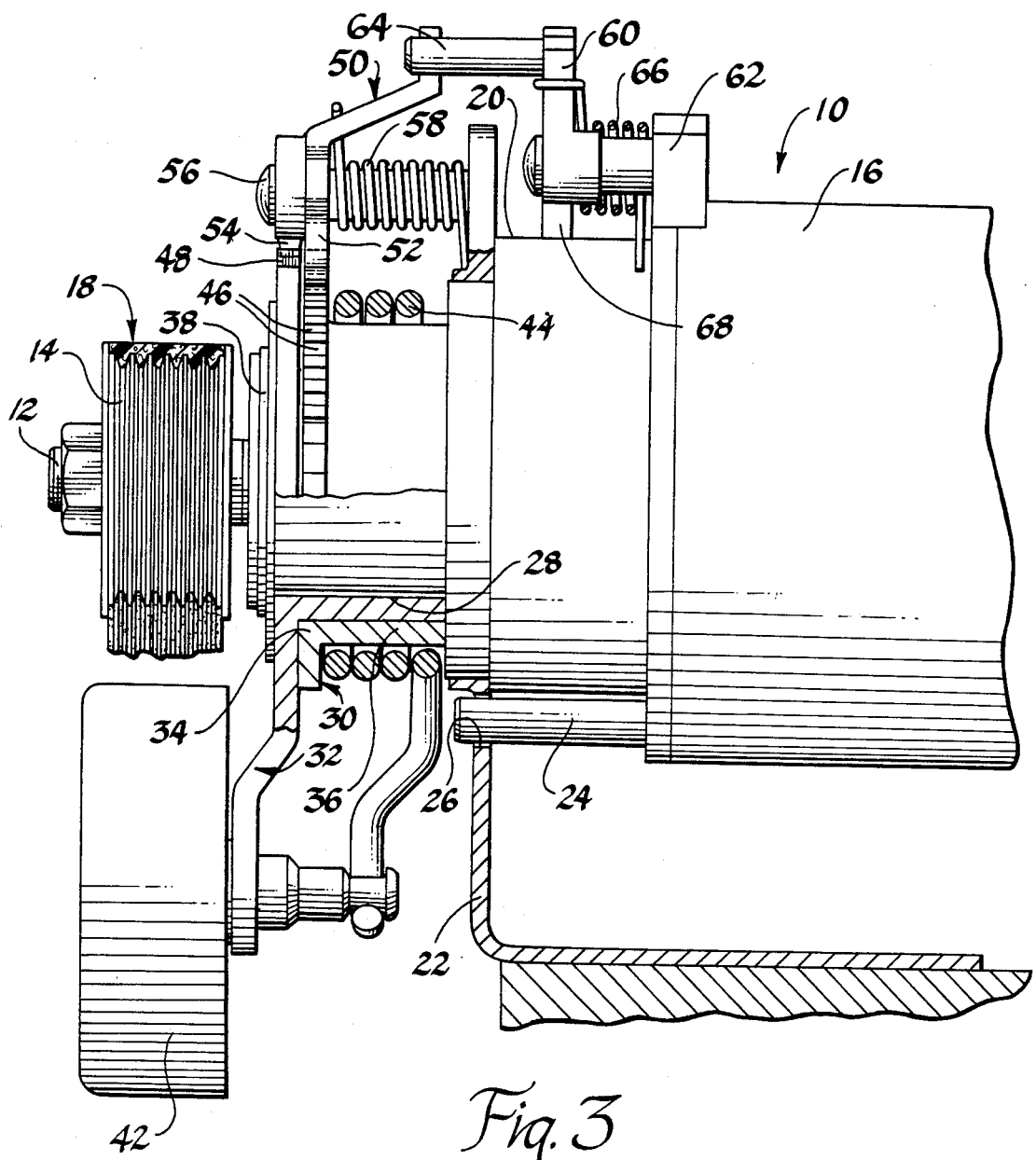
FIG. 3 is a view taken along the line 3—3 of FIG. 1, and showing the position of the locking pawl and trip lever.

Referring next to FIGS. 1, 2 and 3, housing 16 is formed with a pair of larger diameter, axially spaced and cylindrical bearing surfaces 20 that are coaxial to shaft 12, one of which is visible in FIG. 3. A generally U-shaped bracket 22 is rigidly joined to a portion of the vehicle, generally to the engine block. Stargen 10 is mounted by journaling the spaced housing bearing surfaces 20 through the sides of bracket 22. Unlike the conventional rigid mount, the housing 16 is thus free to roll or pivot about the axis of the shaft 12, under the effect of the reaction torque. The degree of pivoting that housing 16 can undergo is limited by a stop pin 24 on housing 16, which is confined in a closed slot 26 in one of the sides of bracket 22. In the FIG. 1 generating mode, the movement of housing 16 will be limited by stop pin 24 hitting the lower end of slot 26, and in the FIG. 2 cranking mode, by stop pin 24 hitting the upper end of slot 26. Pin 24 moves between the ends of slot 26 as the mode changes. Housing 16 also includes a smaller diameter cylindrical bearing surface 28, also coaxial to shaft 12, and located inboard of belt pulley 14. First and second, or upper and lower, tensioner arms, designated generally at 30 and 32 respectively, are mounted so as to swing freely relative to each other, in scissors fashion, about the axis of shaft 12. In the particular embodiment disclosed, this is accomplished by journaling the inner end 34 of lower tensioner arm 32 to the smaller diameter housing bearing surface 28. The inner end 36 of upper tensioner arm 30 is journaled over the outside of lower tensioner arm inner end 34. A suitable retention ring 38 retains both tensioner arms 30 and 32 to housing 16. The outer end of each tensioner arm 30 and 32 carries an idler pulley, 40 and 42 respectively, which is engageable with a respective upper or lower belt runs 18' and 18". A tension spring 44 hooked between the two tensioner arms 30 and 32 continually swings them under force toward one another about the axis of shaft 12. Without more, each idler pulley 40 and 42 would be continually tensioned against a respective belt run 18' and 18", regardless of whether it was slack or tight. However, additional structure acts to automatically disable one arm, 30 or 32, while allowing only the remaining arm, 32 or 30, to act on the then slack run of belt 18, as will be next described.

Still referring to FIGS. 1 through 3, the upper tensioner arm inner end 36 has a series of six detent teeth 46 arranged in an arc about the axis of the shaft 12. The lower tensioner arm inner end 34 has a corresponding series of six detent teeth 48, also arranged about the axis of shaft 12. The two series of teeth 46 and 48 do not overlap to any great extent and are located in different planes. A latching pawl, designated generally at 50, is formed with an upper claw 52 in one plane, and a lower claw 54 in another plane. Pawl 50 is pivoted at 56 to the mounting bracket 22 so as to rock back and forth. When rocked clockwise as in FIG. 1, upper claw 52 engages between a pair of upper tensioner arm detent teeth 46, while lower claw 54 is spaced away from lower tensioner arm detent teeth 48. This may be conveniently referred to as the first latching position of pawl 50. When pawl 50 is rocked counterclockwise as in FIG. 2, which may be termed the second latching position of pawl 50, the converse is true. The claws 52 and 54, and the corresponding detent teeth 46 and 48, are chamfered at the corners, as well as tapered, so as to ease their engagement and disengagement. A torsional return spring 58 hooked between bracket 22 and pawl 50 continually biases pawl 50 in the clockwise direction, toward the first latching position. A latching pawl trip lever 60 is pivoted to a flange 62 on housing 16, and a striker pin 64 extends from the side thereof far enough to overlap with the locking pawl 50, as best seen in FIG. 3. A return spring 66 hooked between housing 16 and trip lever 60 continually biases it counterclockwise, that is, in the opposite direction to the direction in which locking pawl 50 is biased. The strength of trip lever return spring 66 is greater than locking pawl return spring 58, but the torque applied by trip lever return spring 66 is less than the reaction torque seen by housing 16 during the change from generating to cranking mode, for a reason described below. While spring 66 continually biases trip lever 60 counterclockwise, a stop foot 68 engages the outside of housing 16 so as to keep the trip lever striker pin 64 spaced from the latching pawl 50 during the generating mode, as seen in FIG. 1. The operation of the invention in each mode, and its automatic action, will be next described.

Referring next to FIG. 1, given the relative part locations and spring strengths described above, it will be seen that, in the FIG. 1 generating mode, the locking pawl return spring 58 will maintain latching pawl 50 biased toward, and in the first latching position. The engagement of upper claw 52 between a pair of upper tensioner arm detent teeth 46 disables the upper tensioner arm 30, that is, prevents it from swinging toward lower arm 32. The upper tensioner arm idler pulley 40 then acts, in effect, as if it were rigidly mounted, and engages the upper belt run 18' without moving, apart from its dead spindle rotation. The lower tensioner arm 32, however, remains active, engaging and tensioning the lower belt run 18" under the force of tension spring 44. This is exactly what is desired, since, in the generating mode, the upper belt run 18' is tight, while the lower belt run 18" is slack.

Referring now from FIG. 1 to FIG. 2, with a change from the generating to the cranking mode, the counterclockwise reaction torque acting on housing 16 rolls it counterclockwise, until stop pin 24 hits the upper end of slot 26. The rolling housing 16 carries trip lever 60 with it, and striker pin 64 hits latching pawl 50. Since trip lever return spring 66 is stronger than latching pawl return spring 58, the latching pawl 50 is kicked out of its first latching position of FIG. 1 and rocked counterclockwise to the second latching position of FIG. 2. The normal spacing of trip lever striker pin 64 from latching pawl 50 is such that, before the cranking mode limit position of housing 16 is reached, latching pawl 50 will reach the second latching position. At that point, since the reaction torque is stronger than the trip lever return spring 66 as noted above, trip lever 60 can deflect back clockwise. This backward deflection adds a certain amount of flexibility to the system, as contrasted with a rigidly mounted trip lever 60. When the latching pawl 50 so moves from the first the second latching position, the upper tensioner arm 30 is freed, while the lower tensioner arm 32 is simultaneously disabled by the movement of lower claw 54 between a pair of lower tensioner arm detent teeth 48. The chamfering described above allows either claw, 52 or 54, to slip easily between, or out from between, a respective pair of detent teeth, 46 or 48. In the cranking mode, upper tensioner arm idler pulley 40 engages the now slack upper belt run 18' under tension, while the lower tensioner arm idler pulley 42 engages the now tight lower belt run 18" as would a rigidly mounted idler pulley. This automatic selection of the proper belt run results from an entirely mechanical structure, with no need of special sensors or electronic actuators.

Variations of the preferred embodiment described may be made. Some means other than the bearing surfaces 20 could be used to pivot the housing 24 to the vehicle, although they are particularly practical, since the housing 16 is already generally cylindrical in shape. Some limit means other than pin 24 and slot 26 could be used to confine the rolling of housing 16 in response to the shift in reaction torque that comes with a change in mode. A latch other than the latching pawl 50 could be used, so long as it had two discrete latching positions, each latched with only one tensioner arm 30 or 32. Likewise, some latch activation means other than the trip lever 60 could be used, so long as it moved with the housing 16 as it rolled, thereby moving the latch in response to a shift in housing reaction torque. The tensioner arms 30 and 32 could be pivoted directly to the bracket 22 although, as mentioned, it is particularly advantageous to journal them to the housing 16. Likewise, the latching pawl 50 need not be directly pivoted to the bracket 22, but it is convenient to do so, rather than providing a separate pivotal connection within the engine compartment. Therefore, it will be understood that the invention is not intended to be limited to the preferred embodiment disclosed.

The embodiments of the invention in which an exclusive property or privilege is claimed are defined as follows:

1. For use with a combination vehicle generator and starter that has a housing and a central shaft, and which has a generating mode and a cranking mode during which said housing experiences a reaction torque about the axis of said shaft that changes direction with a change in mode, with the tight side and slack side of said belt, relative to said shaft, shifting with a change in mode, a belt tensioner for automatically maintaining the proper tension in said belt in each mode, comprising,
   means mounting said combination generator and starter to said vehicle so that housing can pivot relative to said vehicle about said shaft axis between generating and cranking mode limit positions in response to said reaction torque,
   a pair of tensioner arms, each mounted so as to swing relative to one another about said shaft axis and each having an idler pulley engageable alternately with the slack and tight side of said belt with a change in mode, each of said tensioner arms also having a detent means,
   spring means joined between said tensioner arms to continually swing said tensioner arms about said shaft axis and toward one another,
   a latch mounted so as to be movable relative to said vehicle between alternate latching positions latched with only one of said tensioner arm detent means so as to disable that tensioner arm while the other tensioner arm remains active, and,
   a latch activation means movable with said housing as it moves between said limit positions in response to said housing reaction torque so as to in turn move said latch to disable that tensioner arm that is then on the tight side of the belt, while the other, active tensioner arm engages the other, slack side of said belt, said active and disabled tensioner arms shifting automatically with a change in mode.

2. For use with a combination vehicle generator and starter that has a housing and a central shaft, and which has a generating mode in which said shaft is driven by said belt, so that said housing experiences a reaction torque about the axis of said shaft in one direction, and a cranking mode in which said shaft drives said belt, so that said housing experiences a reaction torque in the opposite direction, with the tight side and slack side of said belt, relative to said shaft, shifting with a change in mode, a belt tensioner for automatically maintaining the proper tension in said belt in each mode, comprising,
   a bracket that is mounted rigidly to said vehicle and to which said combination generator and starter is pivoted so that said housing rolls about said shaft axis between generating and cranking mode limit positions in response to said reaction torque,
   a first tensioner arm journaled to said housing so as to swing about shaft axis and having an idler pulley engageable with that side of said belt that is tight during the generating mode and slack during the cranking mode, said first tensioner arm further having a series of detent teeth thereon arranged about said shaft axis,
   a second tensioner arm journaled to said housing so as to swing about shaft axis and having an idler pulley engageable with the other side of said belt, said second tensioner arm also having a series of detent teeth thereon arranged about said shaft axis,
   spring means joined between said tensioner arms to continually swing said tensioner arms about said shaft axis and toward one another,
   a latching pawl pivoted to said bracket so as to be movable between a first latching position engaged with the detent teeth of said first tensioner arm to disable said first tensioner arm and a second latching position engaged with the detent teeth of said second tensioner arm to disable said second tensioner arm, said latching pawl being biased so as to pivot in said one direction toward said first latching position, and,
   a latching pawl trip member mounted to said said housing so as to be disengaged from said latching pawl when said housing is in said generating mode limit position, so that said latching pawl remains in said first latching position, with said first tensioner arm disabled and said second tensioner arm in active engagement with the slack side of the belt, said trip member moving with said housing as it moves to said cranking mode limit position so as to engage and move said latching pawl against its bias to its second latching position, thereby disabling said second tensioner arm and simultaneously freeing said first tensioner for active engagement with the shifting slack side of said belt, said trip member moving back away from said latching pawl to allow it to return to said first latching position as said housing moves back to said generating mode limit position, whereby the shifting slack side of said belt is automatically tensioned with a change in mode.

* * * * *